(12) United States Patent
Garcia Morchon et al.

(10) Patent No.: US 10,359,996 B2
(45) Date of Patent: Jul. 23, 2019

(54) RANDOM NUMBER GENERATOR AND STREAM CIPHER

(71) Applicant: KONINKLIJKE PHILIPS N.V., Eindhoven (NL)

(72) Inventors: Oscar Garcia Morchon, Eindhoven (NL); Sandeep Shankaran Kumar, Eindhoven (NL); Ludovicus Marinus Gerardus Maria Tolhuizen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/416,353

(22) PCT Filed: Feb. 20, 2014

(86) PCT No.: PCT/EP2014/053268
§ 371 (c)(1),
(2) Date: Jan. 22, 2015

(87) PCT Pub. No.: WO2014/131677
PCT Pub. Date: Sep. 4, 2014

(65) Prior Publication Data
US 2015/0358154 A1    Dec. 10, 2015

(30) Foreign Application Priority Data

Feb. 28, 2013 (EP) ..................... 13157133

(51) Int. Cl.
*G06F 7/58* (2006.01)
*H04L 9/06* (2006.01)

(52) U.S. Cl.
CPC ............ *G06F 7/586* (2013.01); *H04L 9/0656* (2013.01)

(58) Field of Classification Search
CPC ........ G06F 21/602; G06F 7/582; G06F 7/586; G06F 7/588; G09C 5/00; H04L 2209/125; H04L 9/0662; H04L 9/0861; H04L 9/3271
(Continued)

(56) References Cited

U.S. PATENT DOCUMENTS 5,703,952 A * 12/1997 Taylor ................... H04L 9/0668
380/43
7,263,540 B1    8/2007 Keuhnel
(Continued)

FOREIGN PATENT DOCUMENTS

| CN | 101242265 A | 8/2008 |
|----|-------------|--------|
| RU | 2163027 C2  | 2/2004 |
| RU | 2246129 C2  | 2/2005 |

OTHER PUBLICATIONS

Gentle, James E. "Chaper 1. Simulating Random Numbers from a Uniform Distribution", Random Number Generation and Monte Carlo Methods, Statistics and Computing, pp. 1-56, Jan. 2005.
(Continued)

*Primary Examiner* — Brian F Shaw

(57) ABSTRACT

An electronic random number generating device (100) for generating a sequence of random numbers, the electronic random number generating device comprising an electronic parameter storage (110) configured to store multiple functions and for each function of the multiple functions an associated modulus, not all moduli being equal, and an electronic function evaluation device (120) configured to generate an internal sequence of random numbers, the function evaluation device being configured to generate a next number in the internal sequence of random numbers by for each function of the multiple functions, evaluating the function for a previously generated value in the internal sequence of random numbers modulo the modulus associ-
(Continued)

ated with the evaluating function, so obtaining multiple evaluation results, and applying a combination function to the multiple evaluation results to obtain the next number in the internal sequence, and an output (140) configured to generate a next number in the sequence of random numbers from the generated next number in the internal sequence.

11 Claims, 3 Drawing Sheets

(58) Field of Classification Search
USPC .......................................... 380/46; 713/189
See application file for complete search history.

(56) References Cited

U.S. PATENT DOCUMENTS

| 7,860,912 | B1 | 12/2010 | Gyugyi |
| 9,077,520 | B2 | 7/2015 | Garcia Morchon |
| 2005/0044119 | A1* | 2/2005 | Langin-Hooper ...... G06F 7/586 708/250 |
| 2008/0281892 | A1 | 11/2008 | Hemming |
| 2009/0060180 | A1* | 3/2009 | Schneider ............. H04L 9/0662 380/46 |
| 2011/0317838 | A1 | 12/2011 | Garcia Morchon |
| 2013/0279694 | A1* | 10/2013 | Gremaud ........... H04N 21/4181 380/211 |
| 2015/0134960 | A1* | 5/2015 | Garcia Morchon .. H04L 9/0847 713/171 |

OTHER PUBLICATIONS

Johansson, T. "Reduced Complexity Correlation Attacks on Two Clock-Controlled Generators" ASIACRYPT 1998, pp. 342-356.

Bleichenbacher, Daniel et al "Noisy Polynomial Interpolation and Noisy Chinese Remaindering" Advances in Cryptology—Eurocrypt 2000, Lecture Notes in Computer Science, vol. 1807, pp. 53-69.

Rukhin, Andrew et al "A Statistical Test Suite for Random and Pseudorandom Number Generators for Cryptographic Applications" NIST Special Publication 800-22, Apr. 2010.

Hellekalek, P. "Good Random Number Generators are (not so) easy to find", Mathematics and Computers in Simulation, vol. 46, pp. 485-505, Jan. 1998.

Sakamoto, Munetaka et al Combination of Multiplicative Congruential Random-Number Generators with Safe Prime Modulus, Proceedings of the 1995 Winter Simulation Conference, Jan. 1995. pp. 309-315.

* cited by examiner

RANDOM NUMBER GENERATOR AND STREAM CIPHER

CROSS-REFERENCE TO PRIOR APPLICATIONS

This application is the U.S. National Phase application under 35 U.S.C. § 371 of International Application No. PCT/EP2014/053268, filed on Feb. 20, 2014, which claims the benefit of European Patent Application No. 13157133.3, filed on Feb. 28, 2013. These applications are hereby incorporated by reference herein.

FIELD OF THE INVENTION

The invention relates to generating a sequence of random numbers, and to encrypting or decrypting a data sequence with a stream cipher by means of a sequence of random numbers.

BACKGROUND OF THE INVENTION

Random number generation is an important ingredient to many cryptographic algorithms. For example, random numbers are needed to produce nonces, keys, including session keys, etc. Also random numbers may be needed to control cryptographic algorithms themselves. One type of cryptographic algorithms that need an especially large number of random numbers are so-called stream ciphers. In a stream cipher a stream of plain text is encrypted by combining it with a stream of random numbers; typically the two streams are XOR-ed together. It is preferred not to make statistical assumptions about the stream of plain text, which means that the stream of random numbers must be especially resilient to attack; in particular since a large amount of it may be available to the attacker. It is understood that when referring to generated random numbers not true but pseudo random numbers are meant.

Random numbers are also used outside the field of cryptography. For example, random numbers are used in statistics. Also simulations may use random numbers to model the unpredictability of real world events. However the demands placed on random numbers in the field of cryptography differ from those outside that field. In cryptography, security is of overriding importance. Both cryptography and statistics prefer that the generated random numbers are indistinguishable from true random numbers. However, the approach to this differs. In statistics and related fields it is sufficient that no relevant statistical test can detect a difference between the two streams. However, in cryptography it must be assumed that an attacker is willing to invest significant computational resources in investigating the presumed random numbers. For example, an attacker may be interested in predicting future values from past values.

A stream of random numbers to be used in cryptography may preferably be generated fast yet require low resources; say a small smart card or RFID chip. At the same time it must be secure against an attacker willing to invest a disproportional amount of computation. These conflicting demands have produced many proposed designs.

For example, one type of random number generator is the so-called linear shift register. A linear shift register produces a sequence of bits. A next bit in the sequence is computed by calculating a fixed combination of selected previous bits in the sequence. Linear shift registers have long periods, relatively good statistical properties and are fast using low resources. Unfortunately, they are insecure in the face of cryptographic attack: the so-called Berlekamp-Massey algorithm may be used to attack the stream.

The book chapter by James E Gentle: "Chapter 1. Simulating Random Numbers from a Uniform Distribution", In: "Random Number Generation and Monte Carlos Methods (Second Edition)", 1 Jan. 2005 (2005 Jan. 1), Springer, New York, XP055082923, ISBN: 978-0-38-700178-4, pages 1-56, discloses several prior art solutions. It describes in Section 1.8, page 46, that random number generations can often be improved by combining more than one generator, and that the generators that are combined can be of any type. It also describes a combined generator that uses a linear congruentiaql generator and two shift register generators.

An improvement came from taking two independently generated linear shift register sequences and combining them in some non-linear way. Examples of this approach are the so-called shrinking generator or the alternating step generator. The idea being that having two independent linear shift registers doubles the number of parameters that must be determined to attack the sequences; moreover two unrelated sets of parameters must somehow be deduced from a single stream in which their effects are mixed up.

Indeed, it turns out that the combination of two independent sequences generated by linear shift registers indeed increases the difficulty of cryptographic attack. Such attacks nevertheless remain possible however, although they require a larger amount of random numbers to work from. There thus remains a need for improved random number generators.

SUMMARY OF THE INVENTION

It would be advantageous to have an improved random number generator, especially for use in a cryptographic algorithm. The invention is defined by the independent claims. The dependent claims define advantageous embodiments.

An electronic random number generating device for generating a sequence of random numbers is provided. The electronic random number generating device comprises an electronic parameter storage, electronic function evaluation device, and an output. The electronic parameter storage is configured to store multiple functions and for each function of the multiple functions an associated modulus. Not all moduli are equal.

The electronic function evaluation device is configured to generate an internal sequence of random numbers. The electronic function evaluation device is configured to generate a next number in the internal sequence of random numbers by, for each function of the multiple functions, evaluating the function for a previously generated number in the internal sequence of random numbers modulo the modulus associated with the evaluating function, so obtaining multiple evaluation results, and applying a combination function to the multiple evaluation results to obtain the next number in the internal sequence.

The output is configured to generate a next number in the sequence of random numbers from the generated next number in the internal sequence.

The inventors had the insight that generating a random number sequence from two independent sequences is not necessarily an advantage. Rather than complicating the problem the independence may also help the attacker. Indeed attacks on combined linear shift registers try to isolate the streams from each other so as to attack them separately. Typically this is done by making some kind of assumptions ('guesses') on the one stream and validating those by calculating for the other stream. For example, in the paper by T. Johansson, "Reduced Complexity Correlation Attacks on Two Clock-Controlled Generators", published in ASIACRYPT 1998: 342-356 an attack is described on the alternating step generator. It is suggested to wait for a segment of length M containing a small number of ones and make the assumption that only half of the zeros come from the first linear shift register. All the ones and the remaining zeros are then assumed to come from the second linear shift register.

The random number generator proposed by the inventors overcomes this inherent weakness. An internal sequence of random numbers, i.e., internal to the electronic device for generating a sequence of random numbers is generated by applying a combination function to multiple evaluation results. The multiple evaluation results are not obtained independently; instead they each depend on the same internal sequence. A large parameter state and independent contribution to the internal random sequence is achieved by obtaining the multiple evaluation results from functions which are evaluated over different moduli. Mathematically speaking this means that the multiple evaluation results are obtained from mathematically incompatible structures. For example, for the case in which the moduli are primes, these mathematical structures are so-called 'fields', there is no relationship between additions and multiplications between one field and the other. Similar observations hold, when the moduli are not (all) primes, in which case the resulting structures may be characterized as rings.

Preferably, the evaluations of the multiple functions share at least one previous value as a shared input. Again the multiple evaluation results are not obtained independently instead they each depend on the same internal sequence and moreover on a shared value in that sequence. In that case obtaining of the previous value may be done at once for all functions. For example, the function evaluation device may be configured for obtaining a previously generated number in the internal sequence of random numbers, which obtained number may be used in all function evaluations. Alternatively, each evaluation obtains a previously generated number separately.

By means of these steps, the inventors have assured that contribution to the randomness come from multiple sources, each bringing with it parameters which add to the complexity, while at the same time avoiding generating multiple wholly independent sequences which may be exploited by an attacker to simplify attacks. In other words independence is not obtained from independently generated sequences, but by an incompatible underlying mathematical structure.

In a preferred embodiment the sequence of random numbers is used in a cryptographic algorithm, such as a stream cipher.

Storing a function may be done by storing coefficients of the function. For example, a function template may be defined covering many different functions; the stored function selecting a function from the many different functions by selecting from the template, say by selecting coefficients. In a preferred embodiment one or more of the functions are polynomials.

Examples of non-polynomial functions include so-called s-boxes and concatenations thereof. An s-box is a table chosen for its high non-linear properties. For example, one may use the so-called 'SubBytes' step of AES, but instead of using the fixed AES S-box, one may use an S-box selected by parameter from a larger set of s-boxes. Preferably, an s-box array is combined with some diffusing function, say followed by a polynomial.

In cryptography it is considered an advantage when security of a cryptographic algorithm may be linked to the hardness of a problem in a different field. Having such a link increases the trust placed in such cryptographic system. It is a problem how to find for a given cryptographic system such a problem or conversely how to obtain a cryptographic system once a hard problem is identified. Adding to the difficulty is that in the past the hard problems frequently were obtained widely different fields, i.e., number theory, lattice theory, discrete optimization, NP completeness, and the like.

In a most preferred embodiment all of the multiple functions are polynomials. Indeed, in this case an attack on the system appears related to solving another hard problem: In particular, in the case that the polynomials are all of degree 1, an attack on the system is related to solving the so-called 'hidden number problem'. For higher degrees of the polynomials, i.e., at least one having degree 2 or higher, an attack on the random number sequence is related to the so-called 'extended hidden number problem'. In a preferred embodiment all of the multiple functions are polynomials of degree at least 2. For example, one may take precisely two polynomials, each of degree 2.

The associated moduli are not all equal. This assures that at least two mathematically incompatible structures remain, even after combination. Having all moduli unequal would maximize the number of incompatible structures, which is therefore preferred. Alternatively, or even better in addition, one may require that the moduli associated with the multiple functions are relatively prime. Having a common divisor does not necessarily cause the structure to be the same, however there may be some overlap, e.g., over the ideal generated by the common divisor. To eliminate even this chance of partial compatibility having relatively prime moduli is preferred. In practice this may be accomplished by selecting the moduli as different prime numbers. In an embodiment, one may have a first polynomial with a first modulus, and a second polynomial with a second modulus, the second modulus being different from the first modulus.

The size of the moduli is related to the security of the system. A commercially secure system may use, as an example, moduli of 128 bits long. Longer moduli are possible, say, longer or equal to 128, longer or equal to 256; or shorter, say longer or equal to 64 bits.

In a preferred embodiment the previously generated number may be the immediately previously generated number, i.e., if the following sequence has already been generated $x_{n-1}, x_{n-2}$, etc, then the next generated number may depend on at least $x_{n-1}$.

The functions may depend on only a single previous value, however this is not necessary, for example, the functions may be multivariate, say multivariate polynomials, such as bivariate polynomials. In an embodiment, at least one of the functions is a multivariate function in a number of variables, i.e., a number larger than 1, the function evaluation device being configured to obtain the same number of previously generated numbers in the internal sequence of random numbers as the number of variables and to evaluate at least the multivariate function for the number of obtained previously generated numbers. Preferably, there is some or even full overlap between the previous values used from the internal sequence for the multiple function.

For the combination function several choices are possible. A preferred choice for the combination function is integer addition, i.e., the addition defined over the natural numbers. The integer addition mixes well the incompatibilities obtained from the different moduli. Other choices are nevertheless possible. Another possibility for the combination function is the XOR function applied to the binary representations of the evaluation results of all functions.

The output function may simply copy the internal sequence to the outside, however the inventors have found that security is even further improved by shielding part of the output of functions from the outside world. For example, the output may be configured to generate the next number in the sequence of random numbers by selecting a number of bits (b) from the generated next number in the internal sequence, i.e., selecting some but not all of the bits. For example, one may prescribe a pattern for which bits to take, say bits, 3, 5, 8, 13, 21, 34, 55, 89 (in this case b=8). It has been found advantageous to link the value 'b' with other parts of the design, for example, the combination function, as described below. In a preferred embodiment, the b least significant bits are chosen.

It has been found advantageous to include in the combination function also a reduction step, typically as the last step in the combining. For example, the combination function may comprise a modulo operation over a combination modulus. The combination is chosen such that, at least one of the multiple moduli associated with the multiple functions has the property that the combination modulus minus the at least one of the multiple moduli is a multiple of a power of 2, more preferably, all moduli have such a difference, although with a different multiple. The power of two may be chosen larger if more bits are visible outside the electronic device. The multiplier in the multiple is small with respect to the coefficients, e.g., smaller than the power of two. For example, one may take the power of two ($2^b$) as $2^8$ or $2^{16}$, the multiple of a power of 2 may then be taken as smaller than $2^{2b}$, i.e., $2^{16}$ or $2^{32}$ respectively.

For example, in an embodiment, all moduli $m_i$ satisfy the requirement $m_i = N - 2^b c_i$ with $|c_i| < 2^b$, wherein N is a 128 bit large odd number, say a random number, or a prime number. The value N may be taken as the combination modulus. This choice increases the difficulty of the (extended) hidden number problem.

Reducing the number of output bits relates the random number sequence to the so-called noisy polynomial interpolation problem. So far as is known the noisy polynomial interpolation problem may only be attacked using lattice based schemes at considerably large computational effort. See for example, the paper 'Noisy Polynomial Interpolation and Noisy Chinese Remaindering' by Daniel Bleichenbacher and Phong Q. Nguyen. No random number generation linked to the noisy polynomial interpolation problem has yet been proposed.

The leakage, so to say, from the individual functions to the output is largest if by chance the other functions happen to be unusually small or large. Conceivably, an attack may be based on assuming (guessing) that a particular string of outputs correspond to small values of most functions, so that almost all contribution comes from one function. Although at present no such an attack is known, it would follow the pattern of attacks on combined sequences. To proactively thwart such attempts, in an embodiment, a test function is used which determines if the contribution of one function is much larger than those of the others, and if so blocks the output from getting this value. A next iteration is then preformed. In an embodiment, the function evaluation device is configured to apply a test function to the next number in the internal sequence of random numbers to determine if the output is allowed access to the next number in the internal sequence of random numbers, and wherein in case the test function determines that access is allowed, the output generates the next number in the sequence of random numbers from the generated next number in the internal sequence, otherwise the function evaluation device generates a next number in the internal sequence until the test function determines that the output is allowed access to the next number in the internal sequence.

For example, the test function may disallow access if the generated number is smaller than a threshold (e.g. $2^b$ in case 'b' bits are output by the output function), or larger than a threshold (e.g., larger than $N - 2^b$ in case a modulo reduction is also used), or both.

A further aspect of the invention concerns an electronic stream cipher device for encrypting a data sequence with a stream cipher, and an electronic stream cipher device for decrypting a data sequence with a stream cipher. The electronic stream cipher device comprises an electronic random number generating device for generating a sequence of random numbers, a parameter generation device and a combination device. The parameter generation device is configured to obtain a cryptographic key, say receive the key or generate the key etc, and to configure the electronic parameter storage of the electronic device for generating a sequence of random numbers in dependence on the cryptographic key. The combination device is configured for combining the sequence of random numbers generated by the electronic device for generating a sequence of random numbers in dependence upon the configured electronic parameter storage with the data sequence to obtain an encrypted or decrypted data sequence, respectively. For example, the parameter generation device may apply a key expansion function to the key, and take coefficients for functions, say polynomials, moduli and/or initial value of the internal sequence, therefrom. The combination device may XOR the data sequence with the random number sequence.

For example, in an embodiment, a parameter generation device configured to configure the electronic parameter storage of the electronic device for generating a sequence of random numbers with multiple functions determined from the cryptographic key, the sequence of random numbers being generated using the multiple functions determined from the cryptographic key.

The electronic devices for generating the sequence of random numbers and for encrypting or decrypting may be a mobile electronic device, say a mobile phone, or a set-top box, or a computer, or the like.

An aspect of the invention concerns a method for generating a sequence of random numbers, comprising storing multiple functions and for each function of the multiple functions an associated modulus, not all moduli being equal, and generating an internal sequence of random numbers, a next number in the internal sequence of random numbers being generated by, for each function of the multiple functions, evaluating the function for a previously generated number in the internal sequence of random numbers modulo the modulus associated with the evaluating function, so obtaining multiple evaluation results, and applying a combination function to the multiple evaluation results to obtain the next number in the internal sequence, and generating a next number in the sequence of random numbers from the generated next number in the internal sequence.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings.

Figure 1:
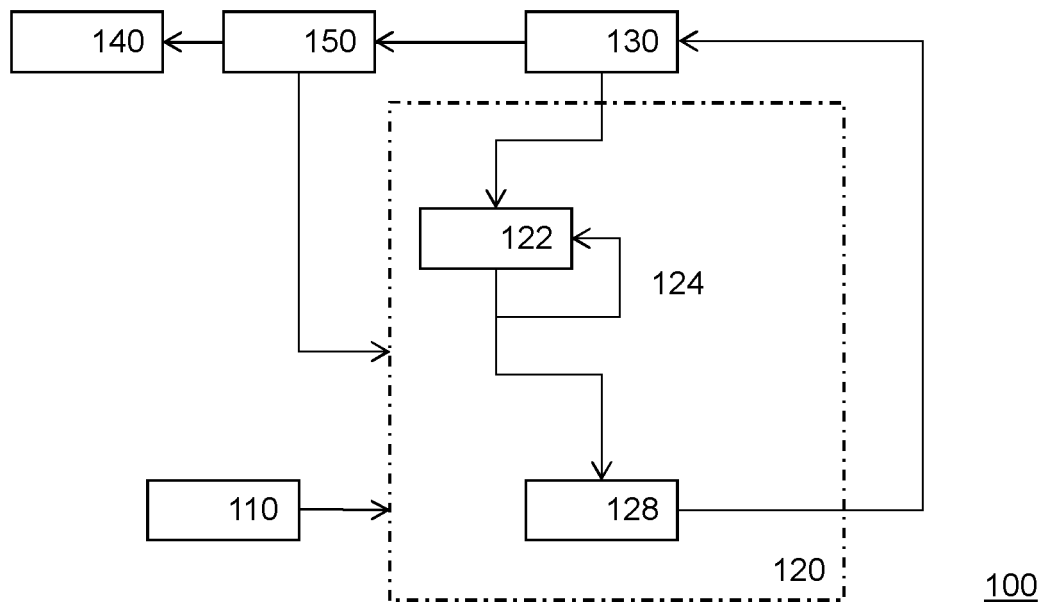
FIG. 1 is a schematic block diagram illustrating an embodiment of an electronic random number generating device for generating a sequence of random numbers.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

The invention may be used with a variety of parameters, functions and the like. Below we will describe a general embodiment electronic device for generating a sequence of random numbers with reference to FIGS. 1 and 3. Below we will give examples of different parameters etc that may be used.

FIG. 1 illustrates in a schematic block diagram an electronic random number generating device 100.

Electronic random number generating device 100 comprises an electronic parameter storage 110, an electronic function evaluation device 120, an internal sequence memory 130 and an output 140. Optionally, electronic random number generating device 100 also comprises a test function device 150.

Electronic random number generating device 100 works by generating an internal sequence of random numbers (the internal sequence for short) by iteratively generating a next value based on already generated values in the internal sequence. A sequence of random numbers for use outside electronic random number generating device 100, also referred to as the external sequence of random numbers (the external sequence for short), is in turn obtained from the internal sequence.

Parameter storage 110 contains a representation for multiple functions. For example, parameter storage 110 may contain a representation of multiple polynomials. Representing a function may be done by listing coefficients, say according to some template. In case parameter storage 110 contains polynomials, one may represent them by listing the coefficients thereof, say be ordering the degrees of the monomials in some fixed ordering. If univariate polynomials are used the coefficient may simply be listed in order of degree. If multivariate polynomials are used some other ordering may be imposed on the degree say a lexicographical ordering.

For each function stored in parameter storage 110 also a modulus is stored associated with that function. The modulus associated with a function will later be used when evaluating that function and ensures that the functions may not easily be separated in the output. The moduli are not all equal, preferably they are all unequal.

Parameter storage 110 may be implemented as an electronic memory, say a flash memory, or magnetic memory, say hard disk or the like. Parameter storage 110 may comprise multiple discrete memories together making up parameter storage 110. Parameter storage 110 may also be a temporary memory, say a RAM. In the case of a temporary parameter storage 110, parameter storage 110 contains some means to obtain parameters before use, say by random generation or by obtaining them over an optional network connection (not shown).

Function evaluation device 120 is connected to parameter storage 110 so that device 120 may obtain the representation of the multiple functions, say multiple polynomials therefrom. Function evaluation device 120 is configured to use the multiple functions to generate a next value in an internal sequence of random numbers and will be more fully explained below.

Sequence memory 130 contains all or part of a generated internal sequence of random numbers. Random number generating device 100 is configured to first generate an internal sequence of random numbers from which the external sequence of random numbers for output is derived. In a simpler embodiment, the external sequence may be taken the same as the internal sequence, however it is found more secure to perform processing on the internal sequence of various kinds before outputting random numbers. At least sequence memory 130 is larger enough to contain a previous value of the internal sequence of random numbers, typically, the immediately previously generated value. In case the functions stored in parameter storage 110 and used by function evaluation device 120 are multivariate, sequence memory 130 is large enough to contain a corresponding number of previous values. Sequence memory 130 is used both as an input to function evaluation device 120 to generate the next value in the internal sequences and as an input to output 140 to generate the next external value. Sequence memory 130 is updated by function evaluation device 120 when a new value is generated. In case the size of sequence memory 130 is limited, say to one or a few values, function evaluation device 120 will overwrite the value generated the most iterations ago.

Since function evaluation device 120 works on previous values, sequence memory 130 needs some initialization. Start values may be generated for sequence memory 130 in various ways. For example, to create a reproducible random sequence, which is desirable when the sequence is used say in a stream cipher, sequence memory 130 may be initialized with a fixed value. For example, the fixed value may be stored in parameter storage 110. For example, all zero may be a suitable start value. In case, reproducibility is not needed, sequence memory 130 may also be initialized with true or other noisy values, say the current time.

Output 140 determines the external sequence from the internal sequence. Although output 140 may not do any processing it is preferred not to export the internal sequence. In an embodiment, output 140 is configured with a number 'b', and output 140 selects b bits from the binary representation of the generated next value in the internal sequence to produce the next value in the external sequence. For example, output 140 may select the b least significant bits.

In the embodiment show in FIG. 1, function evaluation device 120 comprises a function evaluator and an evaluation result combiner. The function evaluator is configured to evaluate a function of the multiple functions shown in parameter storage 110 and to reduce the result modulo the associated modulus. The evaluation is repeated for each function, this in indicated by the returning line 124. The results of the multiple functions are then combined by evaluation result combiner 128. Function evaluation device 120 may have access to some memory to temporarily store the results of evaluation. In case the combination function allows partial evaluation, that memory could be restricted to a single value; otherwise that memory should temporarily store all multiple evaluation results. In an embodiment, evaluation device 120 comprises multiple function evaluators, this benefits parallelization but importantly also allows the use of different function types, without a large expansion of the way in which functions are represented, i.e., the function template.

Evaluation result combiner 128 may be integer addition, this is a preferred choice. Evaluation result combiner 128 may also be an XOR of the binary representations of the function evaluations Evaluation result combiner 128 may also include, typically as the last step, a reduction step to reduce the result. For example, if random number generating device 100 works on fixed size internal words, say of 128 bits, evaluation result combiner 128 may simply truncate the result to fixed size, say by removing most significant bits. However, by using a modulo reduction the link to hard problems may be strengthened as further explained below. The modulus used in a modulo reduction of evaluation result combiner 128 is referred to as the combination modulus (N).

Test function device 150 is an optional but advantageous element. To avoid any one output given information about one particular function of the multiple functions, test function device 150 tests if a value of the internal sequence, which is to be used by the external sequence, is unusually small or large. For example, test function device 150 may test if a number is below a threshold. For example, test function device 150 may test if a number is above a threshold. Test function device 150 may also do both tests. The thresholds may be set such that their logarithms are proportional to the base 2 logarithm of the size of the values.

The upper threshold may be related to the largest modulus of the multiple moduli, or in case it is used, to the combining modulus.

Below a number of exemplifying choices for the parameters which may be used in random number generating device 100 (or in method 300 for a generating a sequence of random numbers as described below) are given.

First example: The external random number sequence may be defined as a sequence: $y_n, y_{n-1}, \ldots$, such that each element $y_n$ corresponds to b bits of another element $x_n$, of an internal sequence, e.g. $y_n = \lfloor x_n \rfloor_{bbits}$, generated from the evaluation of $x_n$ over two finite field polynomials (f and g) and result combined by addition over integers, denoted as: $x_n = <f(x_{n-1})>_p <g(x_{n-1})>_q$. In this notation $< \cdots >_q$ denotes reduction modulo q. Note that $x_n$ may be greater than p or q since it is generated as the addition over the integers, the value can be directly used for subsequent y-values due to the modular operations. The random number generator may use a value $x_0$ as the initial seed to create different sequences, say a random value.

Other embodiments include the following:
1. The sequence $x_n$ can also be constructed as follows $$x_n = <f(x_{n-1})>_p <g(x_{n-2})>_q$$

using random $x_0$ and $x_1$ as the initial seed.
2. Usage of multivariate polynomials, e.g., in two variables, e.g.

$$x_{2n} = <f_1(x_{2n-1}, x_{2n-2})>_p <g_1(x_{2n-1}, x_{2n-2})>_q,$$

$$x_{2n+1} = <f_2(x_{2n-1}, x_{2n-2})>_p <g_2(x_{2n-1}, x_{2n-2})>_q.$$

using random $x_0$ and $x_1$ as the initial seed.
3. Usage of polynomials with a known initial input $x_0$ but in which some random data is used to generate the coefficients of these polynomials.
4. The sequence $x_n$ can also be constructed by using as input a transformation T( ) of the previous value $x_{n-1}$: $T(x_{n-1})$. For instance, T( ) can be an x-bit shifted version of $x_{n-1}$ or map such that the $i^{th}$ bit of $x_{n-1}$ is moved to $j^{th}$ bit in $T(x_{n-1})$.

$$x_n = <f(T(x_{n-1}))>_p <g(T(x_{n-1}))>_q$$

Additionally, the transformations used could be different for the two functions.
5. The sequence $x_n$ can also be constructed by combining the outputs of the polynomials according to a function B( ) such that:

$$x_n = B(<f(T(x_{n-1}))>_p, <g(T(x_{n-1}))>_q)$$

Note that in the above embodiments B( ) is the addition over the integers, but other functions are possible such as XOR, etc.

Below one more way to select parameters is given which is particularly advantageous since it corresponds to a particular hard mathematical problem.

A choice is made regarding the size of combination modulus (N), and the number of bits to output in an iteration (b). In this example, the combination modulus must be odd. The combination modulus may for example be selected randomly. It may be preferred to select a prime number for N to rule out unfavorable factorization of the combination modulus. The combination modulus and b may be regarded as security parameters, a large combination modulus is more secure, and a lower number of bits to output are more secure. Also a choice is made regarding the number of polynomials l, again, more polynomials is more secure. A possible choice is N=128, b=8, l=2. Next the moduli for the polynomials are determined, for each polynomial.

The number b may chosen larger, say 8, 16, 32. The number of polynomials may be larger say three. The size of the combining modulus may be smaller say 32, 64, 80 bits or larger say 196 or 256 or in between these values.

In this embodiment, all moduli $m_i$ satisfy the requirement $m_i = N - 2^b c_i$ with $|c_i| < 2^b$, wherein N is combination modulus. Note that a modulus may both be larger or smaller than the combination modulus. If it is desired to have a maximum on the intermediate values, i.e., N, then the $c_i$ may all be selected positive. The $c_i$ may be selected as follows:

1. Select random small random numbers $c_1 \ldots c_l$
2. Set moduli $m_i = N - 2^b c_i$
3. Test if $m_i$ are relatively prime, if not go to step 1.

Step 3 may be avoided by selecting the $m_i$ as different primes, although this may require testing more candidate $c_i$ values per modulus in order to find a prime, on the other hand it is assured that the collection of all $m_i$ are relatively prime. This also ensures that the functions are evaluated over fields rather than rings.

After the moduli are selected, the polynomials are determined with coefficient modulo the associated modulus, i.e., polynomial i is modulo modulus $m_i$. The coefficients may be chosen randomly. We will assume univariate polynomials but bivariate polynomials are also possible. The polynomials may have equal or different degrees. Preferably at least one of the polynomials has degree two or more.

As the combining function integer addition is used followed by modulo reduction modulo the combination modulus N. Because this modulus is so close to all other moduli the effect is particularly strong. The result of the modulo operation is the next value in the internal sequence. As output function, the b least significant bits of the result of the modulo operation may be used.

This and other embodiments have been tested using the test suite for randomness specified in NIST Special Publication 800-22 "A Statistical Test Suite for Random and Pseudorandom Number Generators for Cryptographic Applications". It was found that the random properties in a random number sequences thus generated was well sufficient for cryptographic uses.

Typically, the electronic random number generating device 100 comprises a microprocessor (not shown) which executes appropriate software stored at the electronic random number generating device 100, e.g. that the software may have been downloaded and stored in a corresponding memory, e.g. RAM or Flash (not shown).

Figure 3:
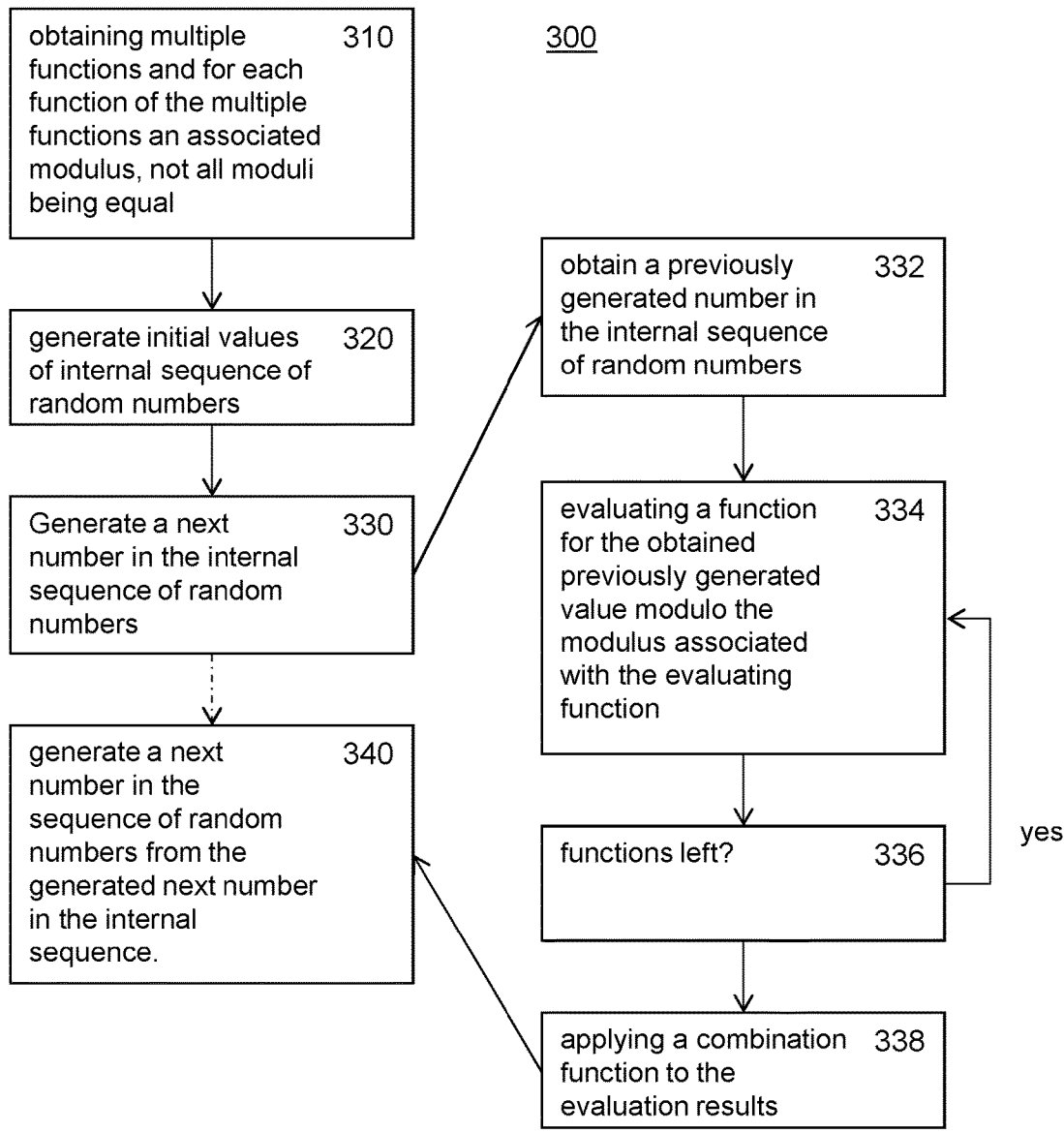
FIG. 3 is a schematic flow chart illustrating an embodiment of a method for generating a sequence of random numbers.

FIG. 3 illustrates in a schematic flow chart a method 300 for a generating a sequence of random numbers. The method may be used with electronic random number generating device 100 though this is not necessary. Nevertheless, method 300 is best executed on an electronic device, in particular as a computer implemented method.

In step 310 multiple functions are obtained and for each function of the multiple functions an associated modulus, not all moduli being equal. In step 320 initial values of the internal sequence of random numbers are generated. For example, these may be noisy values obtained from some other source. In this case the produced sequence will be unpredictable; insofar the initial sequence was unpredictable. Alternatively, these may be determined values, say all 0; in this case the sequence will be reproducible. For an attacker who does not know the initial values, e.g., because they are held secret from him, the sequence will be indistinguishable from a true random sequence. At least any distinguishability will not be sufficient to predict future values of the sequence. In step 330 a next number in the internal sequence of random numbers is generated. This is done in the manner given in steps 332-338. In step 332 a previously generated number in the internal sequence of random numbers is obtained. If the sequence is labeled $x_i$ with the next number now being generated being $x_n$ (higher indices corresponding to more recently generated values), then the number used may be $x_{n-1}$, it may also be another value. Note that in this flow chart the same previous value is used for all functions. This is a preferred situation because it guarantees a dependency between the functions. In step 334 a function is evaluated for the previously obtained generated value of the internal sequence ($x_{n-1}$) modulo the modulus associated with the evaluating function. In case the functions are polynomials or combinations of S-boxes possibly followed by a linear function or a polynomial, such computations are possible on low resource devices. Such functions may also be encoded in a natural manner, say in memory 110. In step 336 it is determined if there are functions left to evaluate, and if so the flow returns to step 334 to evaluate a next function of the multiple function. In step 338 the multiple evaluation results are combined by applying a combination function. For many functions, in particular addition and XOR, and the like, step 338 may be integrated in step 336. In step 340 a next number is generated in the sequence of random numbers from the generated next number in the internal sequence.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 310 and 320 or steps 334 may be executed, at least partially, in parallel. Moreover, a given step may not have finished completely before a next step is started.

A method according to the invention may be executed using software, which comprises instructions for causing a processor system to perform method 300. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

Figure 2:
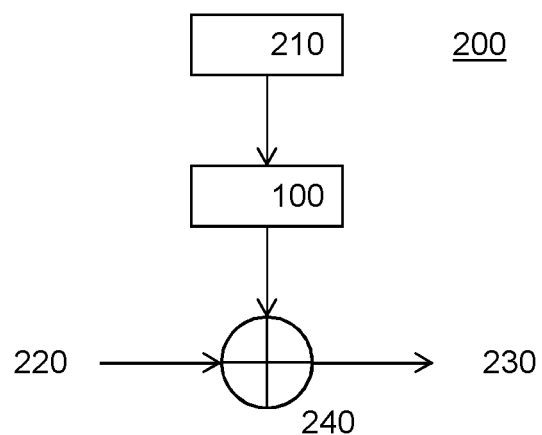
FIG. 2 is a schematic block diagram illustrating a first embodiment of an electronic stream cipher device for encrypting or decrypting a data sequence with a stream cipher.

FIG. 2 illustrates the used of the random sequence in a stream cipher.

The figure shows a parameter generation device 210. Parameter generation device 210 is configured to take a cryptographic key as input and produce parameters for use in electronic random number generating device 100. Note that some of the parameters may be fixed, some may be generated. Typically, the number of polynomials, the number of output bits, and the degrees of the polynomials will be determined beforehand based on an evaluation of the threat model. In this embodiment, parameter generation device 210 will at least generate one of the multiple moduli or the multiple functions. Preferably parameter generation device 210 generates both the multiple moduli and the multiple functions. Parameter generation device 210 may or may not generate the functions themselves. It is preferred that parameter generation device 210 will generate the functions. For example, parameter generation device 210 may generate a sequence of coefficients for use as polynomial coefficients. Stream cipher device 200 further comprises a combination device 240 for combining the sequence of random numbers. Moreover the stream cipher device 200 is configured to obtain a data stream, say from an input, or from storage or from generation, and is configured to further process an output stream. The data stream may represent a plain data stream in which case the output stream is the corresponding encrypted data stream. The data stream may also represent an encrypted data stream in which case the output stream represents the plain data stream. The output stream is obtained from the input stream by combining the latter with a sequence (stream) of random numbers, taken from electronic random number generating device 100.

In operation, parameter generation device 210 receives a cryptographic key; say a 128 bit, or 256 bit key that is secret to the attacker. Possibly parameter generation device 210 also receives a nonce or other data. With the received data parameter generation device 210 configures electronic random number generating device 100, i.e., configures parameter storage 110. At that point electronic random number generating device 100 is configured to produce a sequence of random numbers. Once stream cipher device 200 starts receiving input stream 220, the input stream is combined with the sequence of random numbers. This may be done in a variety of ways, e.g. as is known in the art of stream ciphers per se. In particular combination device 240 may be an XOR device. In this way an output stream is produced. The output stream may be stored, or further processed or transmitted etc.

The initial values of the sequence used by electronic random number generating device 100 may be obtained from the key, or from a counter, or may be fixed; they may also be obtained from memory 110, e.g. configured there by parameter generation device 210.

In an embodiment of stream cipher device 200, the coefficients of polynomials used in the pseudorandom number generator are generated from the secret key K. Then, the pseudorandom generator is formed by polynomials producing as output a random sequence. Each random sequence is then XORed to the plaintext to generate the ciphertext. The decryption process is same as encryption except the input is the Ciphertext message and the output is the Plaintext message.

To enable different pseudo random sequences for the different messages with the same key, a nonce can be used and exchanged together with the cipher text. The nonce can be combined with the initial values in sequence memory 130 or the nonce can be combined with the key as input to generate the polynomial coefficients. By combining with the key, different polynomials can be generated which in turn generate different pseudo random sequences. One way to combine the nonce with the key or counter value is by XORing or concatenating them.

Figure 4:
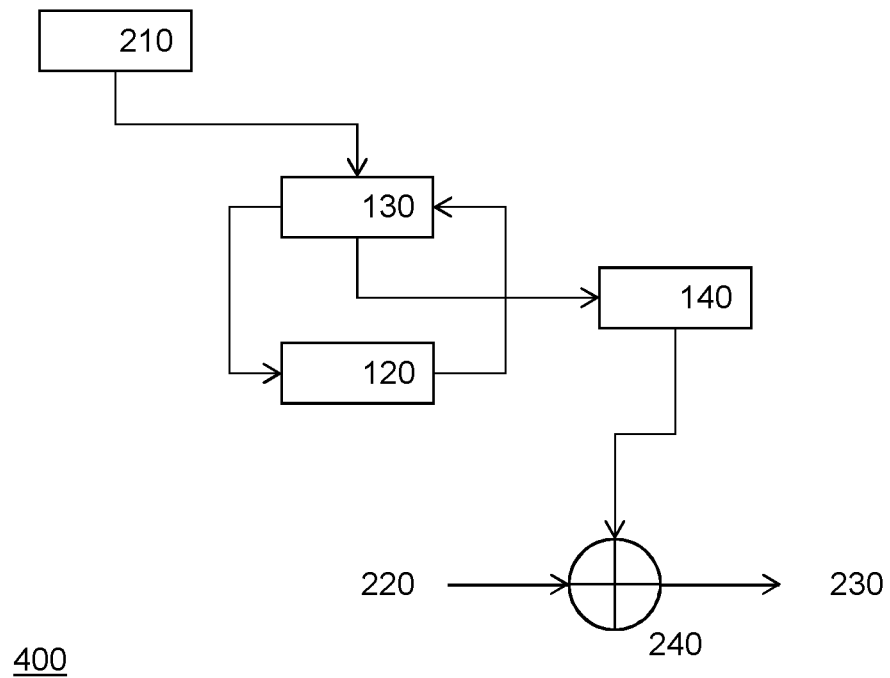
FIG. 4 is a schematic block diagram illustrating a second embodiment of an electronic stream cipher device for encrypting or decrypting a data sequence with a stream cipher.

A different alternative is shown in FIG. 4, which uses fixed and possibly public coefficients for the polynomials and moduli but using the secret key to initialize the pseudorandom number generator.

The process involves using secret key K (or a number derived from K) as the initial seed for the electronic random number generating device 100; As an example, say using two polynomials, say each of degree 2 (but other choices are possible).

The result of the evaluation of both polynomials is combined, say by means of simple addition, obtaining R. Only b bits out of n of R are exposed as the pseudorandom sequence. To generate the next b pseudorandom bits, the last result R is used to update the next input.

An additional element "nonce" may be used in parameter generation device 210 that ensures that the pseudorandom sequences obtained for the same key K are different if a new message is encrypted. A way of doing this would be to take the key K and XORing it with the nonce.

Expanding keys may be done by hashing them, say together with a counter if multiple blocks are needed. Sha-1 and Sha-256 are suitable choices.

Figure 5:
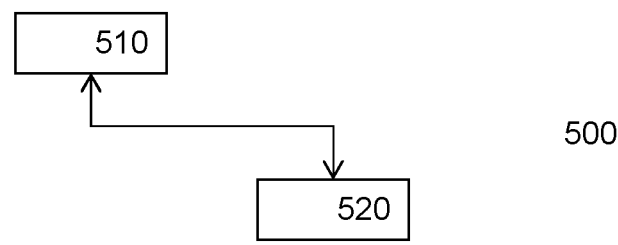
FIG. 5 is a schematic block diagram illustrating an embodiment of a lighting system.

The stream ciphers are applicable in products and services that require securing the communication especially in resource-constrained devices. An example of such a resource-constrained system is lighting control. Such a system is illustrated in FIG. 5. FIG. 5 shows an electric light controller 510, and an electronic light 520. Light controller 510 may monitor and/or control light 520. Light 520 may be say a lamp/LED-driver combination. Light controller 510 and light 520 are configured for two-way communication. However, if only monitoring or only controlling is needed also one-way communication may be used. Light controller 510 and light 520 share a common secret key K. Both light controller 510 and light 520 comprise a device such as stream cipher device 200 or stream cipher device 400. Using the shared secret and possibly a nonce they have exchanged (possibly in plain) earlier, both light controller 510 and light 520 configure an electronic random number generating device 100. If light controller 510 sends a message to light 520 say for controlling it is encrypted as a stream cipher. When the message is received at light 520 the message may be decrypted using the same generated sequence of random numbers. Communication from light 520 to light controller 510 works in reverse.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMERALS IN FIGS. 1, 2, 4 AND 5

100 an electronic random number generating device for generating a sequence of random numbers 110 an electronic parameter storage
120 an electronic function evaluation device
122 a function evaluator
124 a control path
128 an evaluation result combiner
130 an internal sequence memory
140 an output
150 a test function device
200 an electronic stream cipher device for encrypting or decrypting a data sequence with a stream cipher
210 a parameter generation device
220 a data stream
230 an output stream
240 a combination device
400 an electronic stream cipher device for encrypting or decrypting a data sequence with a stream cipher
500 an electronic lighting control system
510 electric light controller
520 an electronic light

The invention claimed is:

1. An electronic stream cipher device for encrypting or decrypting a data sequence with a stream cipher, the device comprising:
an electronic random number generating device for generating a sequence of random numbers, comprising:
an electronic parameter storage configured to store multiple functions and for each function of the multiple functions to store a modulus associated with each function, not all moduli being equal;
an electronic function evaluation device configured to:
generate an internal sequence of random numbers;
generate a next number in the internal sequence of random numbers;
evaluate each function using a previously generated random number of the internal sequence as an input parameter to each function to obtain an evaluation result from each function;
execute the evaluation result of each function modulo the respective modulus associated with each function; and
applying a combination function to the evaluation results to obtain the next number in the internal sequence; and
an output configured to generate a next number in the sequence of random numbers based on the generated next number in the internal sequence;
a parameter generation device configured to obtain a cryptographic key and to configure the electronic parameter storage based on the cryptographic key; and
a combination device for combining the sequence of random numbers based on the configured electronic parameter storage with the data sequence to obtain an encrypted or decrypted data sequence, respectively.

2. The electronic stream cipher device of claim 1, wherein each function of the multiple functions is a polynomial.

3. The electronic stream cipher device of claim 2, wherein at least one of the multiple polynomials has a degree of 2 or higher.

4. The electronic stream cipher device of claim 1, wherein at least one of the functions is a multivariate function in a number of variables, the function evaluation device being configured to obtain the same number of previously generated numbers in the internal sequence of random numbers as a number of variables and to evaluate at least the multivariate function for the number of obtained previously generated numbers.

5. The electronic stream cipher device of claim 1, wherein the combination function is integer addition.

6. The electronic stream cipher device of claim 1, wherein the output is configured to generate the next number in the sequence of random numbers by selecting a number of bits from the generated next number in the internal sequence.

7. The electronic stream cipher device of claim 6, wherein the function evaluation device is configured to apply a test function to the next number in the internal sequence of random numbers to determine if the output is allowed access to the next number in the internal sequence of random numbers; and
when the test function determines that access is allowed, the output is configured to generate the next number in the sequence of random numbers based on the generated next number in the internal sequence, otherwise the function evaluation device is configured to generate a next number in the internal sequence until the test function determines that the output is allowed access to the next number in the internal sequence.

8. The electronic stream cipher device of claim 7, wherein the combination function comprises a modulo operation over a combination modulus, at least one of the moduli associated with the multiple functions having a property that the combination modulus minus the at least one of the moduli is a multiple of a power of 2.

9. The electronic stream cipher device of claim 1, wherein the moduli associated with the multiple functions are relatively prime.

10. A method for encrypting or decrypting a data sequence with a stream cipher by an electronic stream cipher device, the method comprising:
generating a sequence of random numbers by an electronic random number generating device by:
storing multiple functions in an electronic parameter storage, and for each function of the multiple functions storing a modulus associated with each function, not all moduli being equal;
generating an internal sequence of random numbers;
generate a next number in the internal sequence of random numbers;
evaluate each function using a previously generated random number of the internal sequence as an input parameter to each function to obtain an evaluation result from each function;
execute the evaluation result of each function modulo the respective modulus associated with each function; and
apply a combination function to the evaluation results to obtain the next number in the internal sequence;
generating a next number in the sequence of random numbers based on the generated next number in the internal sequence;
obtaining, by a parameter generation device, a cryptographic key and configuring the electronic parameter storage based on the cryptographic key; and
combining, by a combination device, the sequence of random numbers based on the configured electronic parameter storage with the data sequence to obtain an encrypted or decrypted data sequence, respectively.

11. A non-transitory computer-readable medium having one or more executable instructions which, when executed by a processor, cause the processor to perform a method for encrypting or decrypting a data sequence with a stream cipher by an electronic stream cipher device, the method comprising:

generating a sequence of random numbers by an electronic random number generating device by:
  storing multiple functions in an electronic parameter storage, and for each function of the multiple functions storing a modulus associated with each function, not all moduli being equal;
  generating an internal sequence of random numbers;
  generate a next number in the internal sequence of random numbers;
  evaluate each function using a previously generated random number of the internal sequence as an input parameter to each function to obtain an evaluation result from each function;
  execute the evaluation result of each function modulo the respective modulus associated with each function; and
  apply a combination function to the evaluation results to obtain the next number in the internal sequence;
generating a next number in the sequence of random numbers based on the generated next number in the internal sequence;
obtaining, by a parameter generation device, a cryptographic key and configuring the electronic parameter storage based on the cryptographic key; and
combining, by a combination device, the sequence of random numbers based on the configured electronic parameter storage with the data sequence to obtain an encrypted or decrypted data sequence, respectively.

* * * * *